(12) United States Patent
Mignon et al.

(10) Patent No.: US 10,458,837 B2
(45) Date of Patent: Oct. 29, 2019

(54) AGRICULTURAL VEHICLE WITH LOAD CELLS DIRECTLY BETWEEN UPPER AND LOWER FIXATION PLATES

(71) Applicant: KUHN-AUDUREAU SA, La Copechagniere (FR)

(72) Inventors: Florent Mignon, Saint-Andre-Goule-d'Oie (FR); Alain Portrait, Montaigu (FR); Mickael Cosson, La Merlatiere (FR)

(73) Assignee: KUHN-AUDUREAU SA, La Copechagniere (FR)

( * ) Notice: Subject to any disclaimer, the term of this patent is extended or adjusted under 35 U.S.C. 154(b) by 159 days.

(21) Appl. No.: 15/636,846

(22) Filed: Jun. 29, 2017

(65) Prior Publication Data
US 2018/0003546 A1 Jan. 4, 2018

(30) Foreign Application Priority Data

Jun. 30, 2016 (FR) ...................................... 16 70356

(51) Int. Cl.
*G01G 19/08* (2006.01)
*G01G 23/01* (2006.01)
(Continued)

(52) U.S. Cl.
CPC ......... *G01G 19/08* (2013.01); *A01D 41/1271* (2013.01); *A01D 90/12* (2013.01);
(Continued)

(58) Field of Classification Search
CPC ........ G01G 19/08; G01G 19/14; G01G 23/00; G01G 23/01; G01G 23/002; G01G 23/10;
(Continued)

(56) References Cited

U.S. PATENT DOCUMENTS 3,603,418 A * 9/1971 Schmidt ............... G01G 3/1406
177/136
4,884,544 A * 12/1989 Sheppard ................ F02D 11/04
123/400
(Continued)

FOREIGN PATENT DOCUMENTS

CN 104160976 11/2014
DE 298 20 808 U1 3/2000
(Continued)

OTHER PUBLICATIONS

French Preliminary Search Report dated Mar. 9, 2017 in French Application 16 70356, filed on Jun. 30, 2016 (with English Translation of Categories of Cited Documents & Written Opinion).

*Primary Examiner* — Randy W Gibson
(74) *Attorney, Agent, or Firm* — Oblon, McClelland, Maier & Neustadt, L.L.P.

(57) ABSTRACT

An agricultural vehicle including a container, which is mounted on at least one train of wheels, wherein the container rests by way of fixation brackets and load cells or weight sensors, preferably directly, i.e. without use of an intermediate chassis, on one axle or more forming the train of wheels. The vehicle container is mounted on the axle or each of the axles of the train under consideration by way of at least two pairs of load cells, wherein each pair consists of two load cells situated on opposite sides of a vertical plane parallel to the vertical planes containing the axes of the axles of a multi-axle train.

13 Claims, 5 Drawing Sheets (51) Int. Cl.
*A01D 41/00* (2006.01)
*A01D 41/127* (2006.01)
*A01D 90/12* (2006.01)
*A01K 5/00* (2006.01)
*G01G 19/14* (2006.01)
*G01G 23/00* (2006.01)
*G01G 23/10* (2006.01)

(52) U.S. Cl.
CPC ............... *A01K 5/00* (2013.01); *A01K 5/004* (2013.01); *G01G 19/14* (2013.01); *G01G 23/002* (2013.01); *G01G 23/01* (2013.01); *G01G 23/10* (2013.01); *A01D 41/00* (2013.01); *G01G 23/00* (2013.01)

(58) Field of Classification Search
CPC .... A01D 41/1271; A01D 90/12; A01D 41/00; A01K 5/00; A01K 5/004
See application file for complete search history.

(56) References Cited

U.S. PATENT DOCUMENTS

| | | | | |
|---|---|---|---|---|
| 4,969,539 | A * | 11/1990 | Ishibashi | B62L 1/14 188/24.14 |
| 5,429,436 | A * | 7/1995 | Stone | A01F 29/005 241/186.4 |
| 6,313,414 | B1 * | 11/2001 | Campbell | G01G 19/08 177/136 |
| 8,326,563 | B2 * | 12/2012 | Kraus | A01F 15/0833 702/102 |
| 9,182,269 | B2 * | 11/2015 | Kraus | G01G 9/00 |
| 2004/0163577 | A1 | 8/2004 | Van Der Plas | |

FOREIGN PATENT DOCUMENTS

| | | |
|---|---|---|
| DE | 201 15 929 U1 | 2/2003 |
| DE | 101 54 733 A1 | 5/2003 |
| DE | 103 48 206 A1 | 5/2005 |

\* cited by examiner

AGRICULTURAL VEHICLE WITH LOAD CELLS DIRECTLY BETWEEN UPPER AND LOWER FIXATION PLATES

BACKGROUND

The present invention relates to the field of agricultural machinery, more particularly to rolling agricultural stock designed to transport feedstuffs or other materials, and capable of weighing the quantity being transported.

The invention relates more specifically to an agricultural vehicle equipped with a container and a weighing means, especially a dump trailer, a mixing trailer or analogous equipment.

In certain applications in the agricultural sector, it is highly desirable to be able to weigh a load being transported by a vehicle such as a trailer without the need for additional external weighing means, i.e. by incorporating an integrated weighing means that preferably is adjusted for the tare weight of the empty container.

This is the case in particular for mixers or mixing trailers designed to achieve distribution of fibrous, granular and/or powdered feed mixtures in bulk in the form of rations optimized in the nutritional and technico-economic respects.

In this context, weighing is the key element for producing the ration corresponding to the total of the constitutive feedstuffs of a diet distributed daily to satisfy their needs. Thus, in the case of milk production from dairy cattle, the ration must be practically identical at all times; it is composed of rough forage (hay, grass silage and corn silage), succulent feed (cereals) and concentrated feed (legumes, protein grains) to compensate for possible nutritional imbalances.

To obtain a relatively homogeneous mixture to be distributed, these pieces of equipment comprise rotating elements such as screws. This is the case in particular for mixers of the type known by the names "EUROMIX" or "PROFILE" (registered trademarks) of the KUHN Co.

Of course, these mixers also have a drawbar hitch and a rolling device of single-axle or double-axle type (for high-capacity mixers).

In certain alternative embodiments of these known mixers, as well as in the mixer known from the document DE 10348206, the container designed to hold the ration rests on a double axle by way of analog load cells or weighing sensors, preferably directly, i.e. without use of an intermediate chassis. In fact, a construction without chassis is simpler and less expensive, since a complex chassis does not have to be assembled (the chassis is complex because the combination of the body and unloading/mulching equipment has to be suspended).

In this embodiment known from the aforesaid DE document, the container rests on a double axle via two load cells, i.e. via one load cell arranged close to each front wheel (that which is pushed by the load-cell connection). These two load cells normally support most of the load. These two load cells are cantilever-mounted, thus necessitating reinforcement at container height to ensure sufficient structural stability. This limited number of bracing and connecting points does not favor optimum distribution of forces and stresses at the level of the container (generally a box of mechanically welded sheet metal). The weighing means also has at least one additional load cell at the level of the drawbar, more precisely at the level of the hitch eye.

In addition, in high-capacity machines, the load cells, especially the two load cells assuring the container-axle connection, must be dimensioned such that they can support heavy loads. This results in the use of load cells, the vertical space requirement of which is extensive, in particular because of a larger cross section, and the price of which is high. The bottom of the container is therefore displaced (upward) at some distance from the wheels, thus reducing the stability of the mixers in the loaded state (upward displacement of the center of gravity), making their loading more cumbersome and possibly preventing them from moving through doors or access passageways of limited height.

BRIEF SUMMARY

The problem facing the present invention is to propose a solution capable of overcoming the aforesaid limitations, in particular, but not limitatively, for mixers or mixing trailers.

To this end, the object of the invention is an agricultural vehicle comprising a container, which is mounted on at least one train of wheels, especially a trailer, skip, mixer or mixing trailer, and in which the container rests by way of fixation plates or brackets and load cells or weighing sensors, preferably directly, i.e. without use of an intermediate chassis, on one axle or more forming the said train of wheels, which vehicle is characterized in that the container is mounted on the axle or each of the axles of the train under consideration by way of at least two pairs of load cells, wherein each pair consists of two load cells situated on opposite sides of a vertical plane containing the axis of the axle, in the case of a single-axle train, or of a plane parallel to the vertical planes containing the axes of the axles of a multi-axle train.

BRIEF DESCRIPTION OF THE DRAWINGS

The invention will be better understood by virtue of the description hereinafter, which relates to preferred embodiments, provided by way of non-limitative examples, and will be explained with reference to the attached schematic drawings, wherein.

DETAILED DESCRIPTION

FIGS. 1 to 7 show, at least partly, an agricultural vehicle 1 comprising a container 2, which is mounted on at least one train 1' of wheels 6, 6', especially a dump trailer, mixer or mixing trailer, and in which container 2 rests by way of fixation plates or brackets 9, 11 and load cells or weighing sensors 4, 4', preferably directly, i.e. without use of an intermediate chassis, on one axle or more forming the said train 1' of wheels.

According to the invention, container 2 is mounted on axle 3 or each of the axles 3 of train 1' under consideration by way of at least two pairs 5 and 5' of load cells 4, 4', wherein each pair 5, 5' consists of two load cells 4 and 4' situated on opposite sides of a vertical plane PV containing the axis X of axle 3, in the case of a single-axle train 1', or of a plane PV parallel to the vertical planes containing the axes X, X', X" of the axles 3 of a multi-axle train 1'.

Advantageously, the two load cells 4 and 4' of a given pair 5, 5' are arranged substantially symmetrically relative to the associated vertical plane PV, and the load cells 4, 4' of two pairs (forming one and the same axle-container connection) are identical. As a variant, the two load cells 4 and 4' of a given pair 5, 5' may be arranged asymmetrically relative to the associated vertical plane PV, wherein the load cells of the two pairs may be different if appropriate.

Load cells 4, 4' are preferably arranged perpendicular to the associated plane PV, but they may also be arranged parallel to this plane, i.e. parallel to the corresponding axis X, X', X".

These different possibilities of arrangement of load cells 4, 4' do not have any noteworthy influence on the reliability or quality of weighing.

Figure 1:
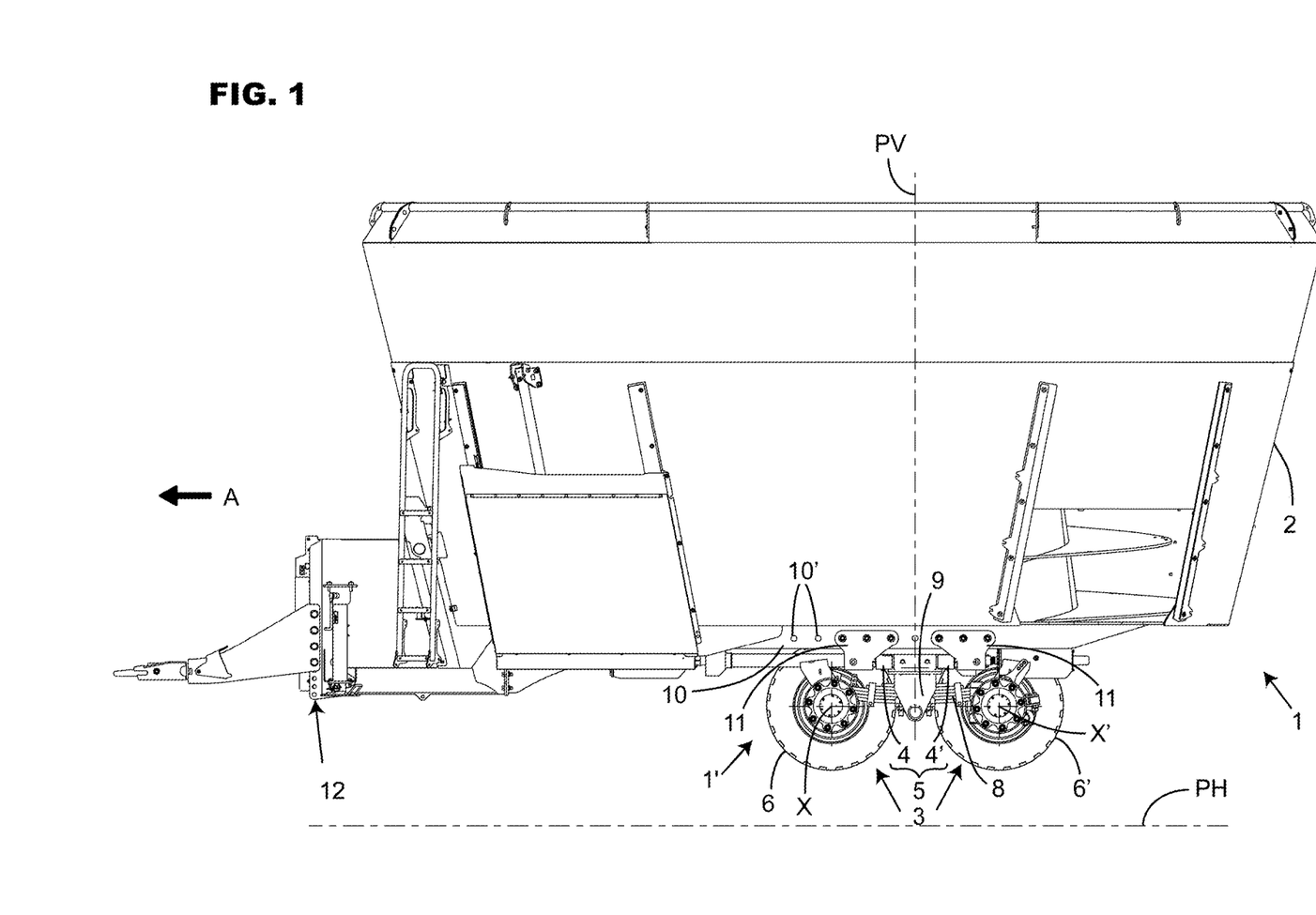
FIG. 1 is a view in side elevation of a vehicle in the form of a tandem-axle mixing trailer according to a first embodiment of the invention.
Figure 2:
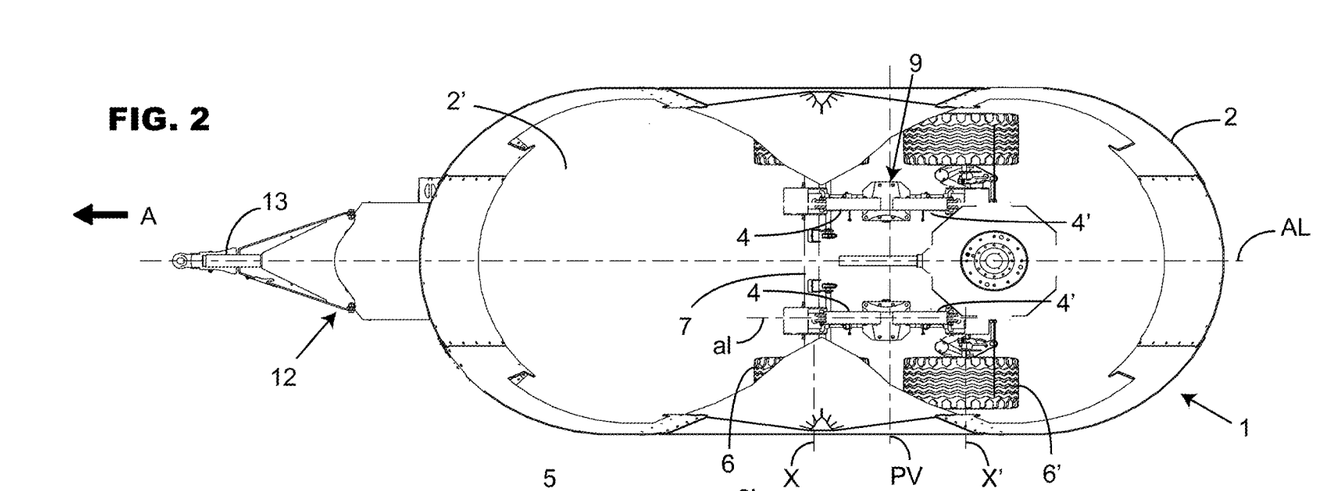
FIG. 2 is a partly cutaway view from above, via the bottom of the container, of the vehicle represented in FIG. 1.
Figure 3:
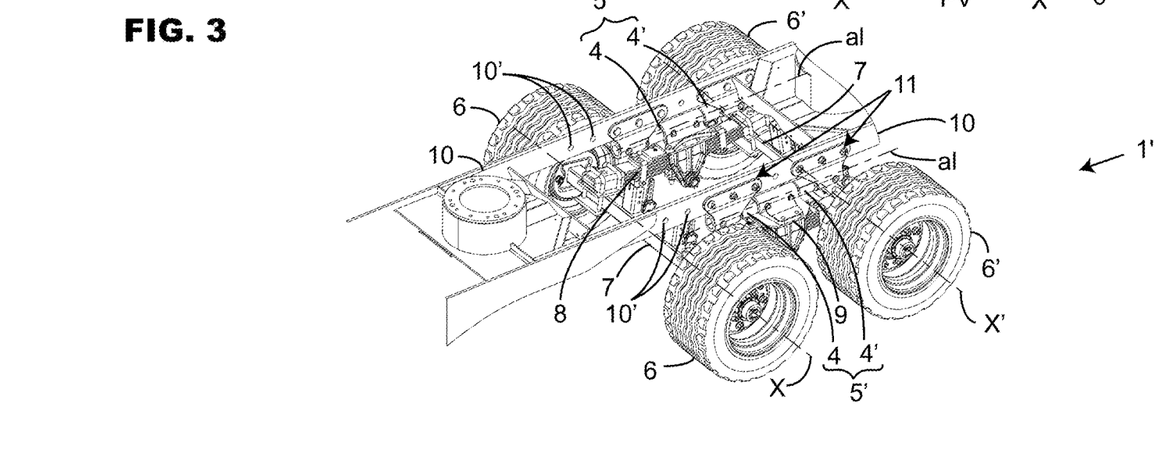
FIG. 3 is a partial view in perspective of the rolling device of the vehicle of FIGS. 1 and 2, wherein the container and the drawbar have been removed.
Figure 4:
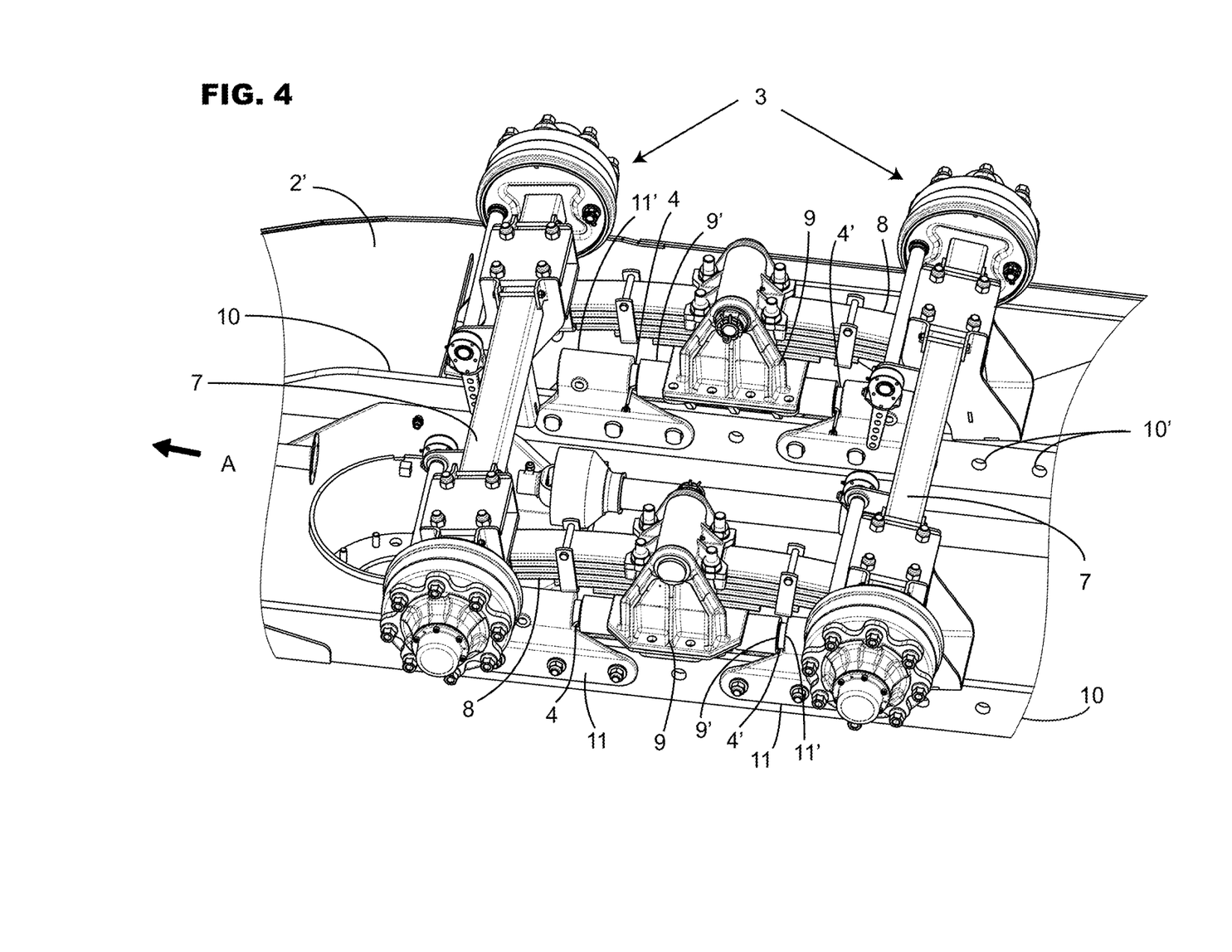
FIG. 4 is a partial detail view from underneath and on a different scale of the connection zones between the double axle and the bottom of the container of the vehicle represented in FIGS. 1 and 2.
Figure 5:
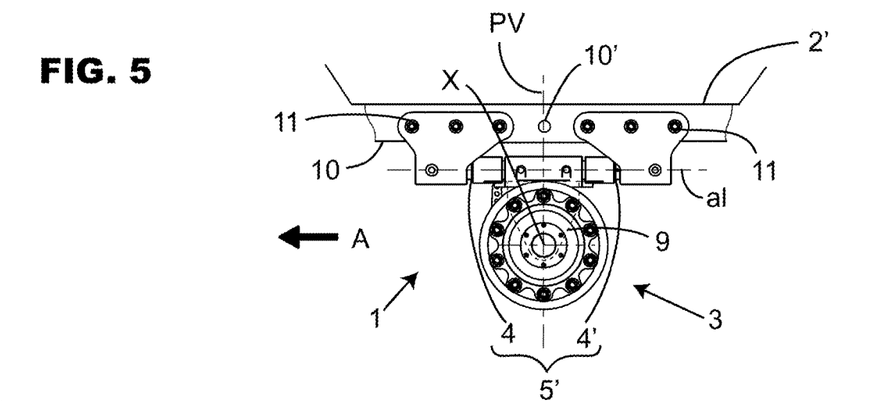
FIG. 5 is a partial view in side elevation of the connection zone between a single or one axle and the bottom of the container of the agricultural vehicle, according to a second embodiment of the invention.

As is shown in particular in FIGS. 2 to 4, each pair of load cells 5, 5' is offset laterally relative to longitudinal axis AL of vehicle 1 in the direction, and preferably immediate proximity, of wheel 6 or of wheels 6, 6' of train 1', situated on one side of vehicle 1.

By virtue of the use of at least four load cells 4, 4' for each connection comprising container 2 and axle 3, and of the two-by-two arrangement of the said load cells at the level of axle 3 in question, the invention makes it possible to reduce the dimension of load cells 4, 4' being used, while being able to support a heavier load, and it permits a better distribution of forces in the box or container 2. The reduced dimension of load cells 4, 4' also makes it possible to achieve a vertically compact solution for a given size of container 2. As it happens, the height of vehicle 1 is determining with respect to whether or not a building can be entered. A reduced height of vehicle 1 is also advantageous during loading of the box with, for example, the feedstuffs constituting the ration.

The use of four load cells 4 and 4' via connection with an arrangement that may or may not be symmetric and is at a distance from vertical plane PV in question achieves a rigid and strong connection with good stress distribution, taking into account the multiplication and the spacing of points of fixation with container 2.

In fact, the relative spacing between these permits a more spatially balanced distribution of forces in bottom 2' of container 2.

Finally, a reduction of the cross section of load cells 4, 4' also results in a more reliable connection, an improvement of vertical compactness and a reduction of the cost prices as well as the empty weight of vehicle 1. The load on each load cell 4, 4' and therefore their individual stress are also lessened; the same is true for the fixation and assembly elements connecting the said load cells 4, 4' to container 2 and to the axle 3 in question.

In agreement with a preferred embodiment shown in FIGS. 2 to 5 in particular, each load cell 4, 4' is integrally joined, on the one hand, in downward direction, with crosspiece 7 of the one axle 3 or with a suspension element 8 (for example, a leaf spring) connecting the crosspieces 7 of two axles 3 by way of a first fixation plate or bracket 9 and, on the other hand, in upward direction, with the bottom 2' of container 2 or with a longitudinal beam 10 extending under the said bottom 2' by way of a second fixation plate or bracket 11, thus providing a rigid connection between the said container 2 and the crosspiece or crosspieces 7 of axle 3, wherein the zones of solidarity of second plates or brackets 11 of the two load cells 4, 4' of a given pair 5, 5' with bottom 2' or a longitudinal beam 10 are situated at a distance from the vertical plane PV associated with the pair under consideration.

Advantageously, the two load cells 4 and 4' of a given pair of load cells 5, 5' are integrally joined with crosspiece 7 of the one axle 3 or with suspension element 8 connecting the crosspieces 7 of two axles 3 by way of one and the same lower bracket or plate 9 constituting two opposite and symmetric mounting sites 9' for the said load cells 4 and 4' of the pair 5, 5' under consideration. This therefore results, for each pair 5, 5', in an arrangement of connections comprising a spaced double connection with container 2 and a single connection with axle 3.

As FIGS. 4 to 7 show, different constructions of train 1' of wheels 6, 6' are capable of integrating the specific technical arrangements of the invention described below and hereinafter.

Thus, in relation to the most common embodiments of rolling devices and of trains 1' of wheels of agricultural vehicles 1 of the trailer type, the invention may be implemented in a construction:

with one or a single axle 3 (FIG. 5);
with two axles 3 (FIGS. 4 and 6) or the double (bogie) or tandem type;
with three axles 3 (FIG. 7) arranged in tridem.

The use of a tandem axle or of a triple axle is recommended in the case of a container 2 of very large capacity and for regular highway use, since these axles permit better load distribution. The tandem axle is thought of as two single axles that are independent of one another.

In the particular arrangement of load cells 4 and 4', the load components act in the load direction of the load cell. Thus no parasitic loads are present that could generate errors in the weighing result.

In agreement with a first variant, represented in FIGS. 1 to 4, it may be provided that, in the case of a train 1' of wheels with two axles 3, the axles 3 are fixed at the two opposite ends of an elongated suspension element 8 in the form of a leaf-spring arrangement, wherein the two load cells 4, 4' of each of the said pairs are integrally joined in centered manner with the said leaf-spring arrangement by a lower fixation bracket 9.

In this way, a double-axle construction is obtained.

Figure 6:
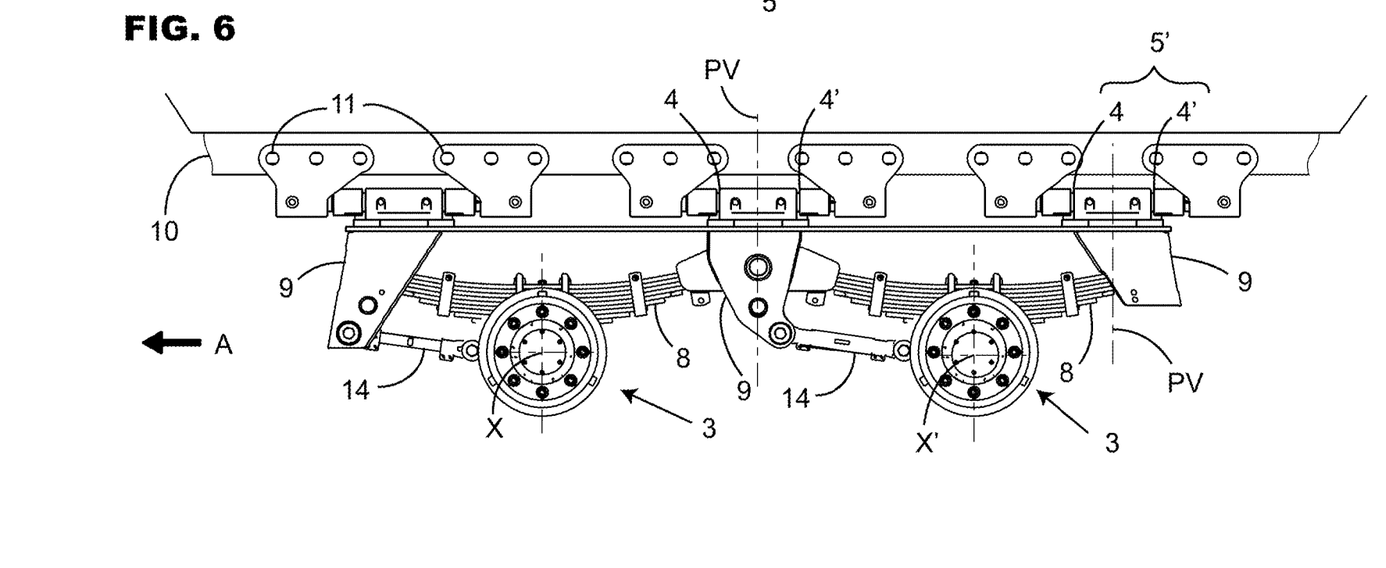
FIG. 6 is a partial view in side elevation of the connection zone between two axles mounted in tandem and the bottom of the container of the agricultural vehicle, according to a third embodiment of the invention, and, FIG. 7 is a partial view in side elevation of the connection zone between three axles mounted in tridem and the bottom of the container of the agricultural vehicle, according to a fourth embodiment of the invention.

In agreement with a second constructive variant, represented in FIG. 6, it may also be provided that, in the case of a train 1' of wheels with two axles 3, each axle 3 is fixed in centered manner with an elongated suspension element 8 in the form of a leaf-spring arrangement, wherein the two opposite ends of the said leaf-spring arrangement 8 are each integrally joined with a pair 5, 5' of load cells 4, 4' by way of a fixation bracket 9, wherein one of the said brackets 9 is connected if necessary to the facing or mutually close ends of the two elongated suspension elements 8.

A construction with two axles 3 mounted in tandem is then obtained.

Figure 7:
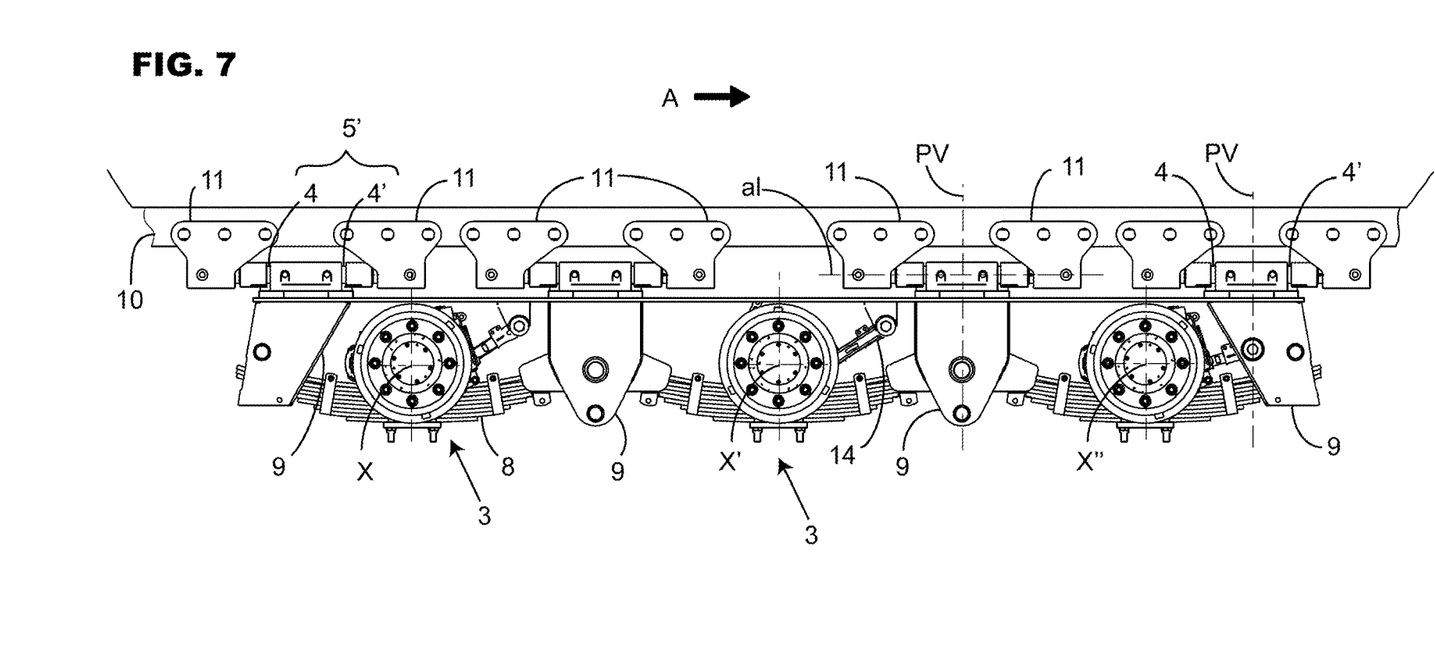

As FIGS. 6 and 7 show, lower brackets or plates 9 situated in front of axles 3 in rolling direction A may if necessary serve as anchoring points for rods 14 connected to crosspieces 7 or to their calipers that join them integrally with the ends of the elongated suspension elements in order to stabilize axle 3 in question against resistive rolling forces or stresses.

According to one characteristic of the invention, each load cell 4, 4' has an elongated structure, with a preferred extension along a longitudinal axis al, wherein the longitudinal axes al of the four load cells 4, 4' of the two pairs 5, 5' assigned to axle 3 or to one and the same crosspiece 7 are all situated in one and the same horizontal plane PH, while being preferentially parallel to longitudinal axis AL of agricultural vehicle 1.

According to a constructive variant that makes it possible, especially in relation with the preceding characteristic, to achieve a vertically limited space requirement, each of the four load cells 4, 4' of the two pairs 5, 5' assigned to axle 3 or to one and the same crosspiece 7 has an elongated structure extending along a longitudinal axis al, wherein the two load cells 4 and 4' of each pair 5, 5' are conformed and mounted in such a way that their mounting sites 9', 11' at the level of first plate 9 and at the level of the two second plates 11 respectively are substantially aligned.

In agreement with an advantageous choice among the solutions of weighing sensors known to the person skilled in the air, each load cell 4, 4' may consist of an oriented or unidirectional bending or shear sensor, preferably of an elongated strain gauge of cylindrical form, deformable under stress in a direction transversal relative to its longitudinal direction al and substantially rigid in the other directions.

According to another characteristic of the invention, bottom 2' of container 2 is mounted on two longitudinal support beams 10 that constitute a plurality of sites 10' for integrally joining upper fixation brackets or plates 11 of load cells 4, 4', permitting a plurality of relative fixation positions for the pairs of load cells 5 and 5' relative to container 2 in longitudinal direction AL of agricultural vehicle 1.

Although other solutions could be envisioned, such as, for example, stop bolts or pins, it is advantageously provided that second plates or brackets 11 are integrally joined with longitudinal beams 10 by screwing.

Mounting of the axle on container 2 by screwing or by stop pins makes it possible to position axle 3 on request according to the desired version and equipment, i.e. according to the position of the center of gravity. In addition, the equilibrium of vehicle 1 is optimum and the radius of gyration is also optimized.

The load on drawbar 12 is then better controlled and the structure and dimensioning of the drawbar may then be optimized.

One alternative could be a plate 11 to be welded onto longitudinal beam 10, but without the advantages of optimization as a function of the pieces of equipment.

Preferably, vehicle 1 has a drawbar 12, which is connected to container 2 and/or to longitudinal support beams 10 disposed under bottom 2' of the said container 2, in this case by way of an additional load cell 13, which may or may not be identical to the other load cells 4 and 4'.

The longitudinal axes of longitudinal beams 10 and those al of load cells 4 and 4' of the pair in question are advantageously situated in the same vertical planes.

Of course, the invention is not limited to the embodiments described and represented in the attached drawings. Modifications are still possible especially from the viewpoint of the constitution of the various elements or by substitution of equivalent techniques, without departing from the scope of protection of the invention.

The invention claimed is:

1. An agricultural vehicle comprising:
   a container mounted on at least one train of wheels;
   two beams mounted on a bottom of the container and extending in a longitudinal direction of the agricultural vehicle;
   a pair of upper fixation plates including a first upper fixation plate and a second upper fixation plate mounted to each beam and spaced apart in the longitudinal direction;
   a lower fixation plate positioned between the first and second upper fixation plate of each pair of upper fixation plates in the longitudinal direction;
   one axle or more forming said train of wheels,
   wherein the container is mounted on the axle or each of the axles by way of at least two pairs of load cells,
   wherein each pair of load cells consists of two load cells including a first load cell positioned directly between the first upper fixation plate and the lower fixation plate and a second load cell positioned directly between the second upper fixation plate and the lower fixation plate such that the two load cells are situated on opposite sides of a vertical plane extending in a lateral direction of the agricultural vehicle and containing the axis of the axle, in the case of a single-axle train, or of a plane parallel to vertical planes containing the axes of the axles of a multi-axle train.

2. The vehicle according to claim 1, wherein the two load cells of a given pair are arranged substantially symmetrically relative to an associated vertical plane, wherein the load cells of the two pairs are identical, and wherein each pair of load cells is offset laterally relative to the longitudinal axis of the vehicle in a direction of the wheel or of the wheels of the train, situated on one side of the vehicle.

3. The vehicle according to claim 1, wherein the two load cells of a given pair are arranged asymmetrically relative to an associated vertical plane and wherein each pair of load cells is offset laterally relative to the longitudinal axis of the vehicle in a direction of the wheel or of the wheels of the train, situated on one side of the vehicle.

4. The agricultural vehicle according to claim 1, wherein each load cell is integrally joined, on the one hand, in a downward direction, with a crosspiece of the one axle or with a suspension element connecting crosspieces of two axles by way of a first fixation plate and, on the other hand, in an upward direction, with the bottom of the container or with a longitudinal beam extending under said bottom by way of a second fixation plate, thus providing a rigid connection between said container and the crosspiece or crosspieces of the axle, wherein zones of solidarity of the second plates of the two load cells of a given pair with the bottom or a longitudinal beam are situated at a distance from a vertical plane associated with the given pair.

5. The vehicle according to claim 4, wherein the two load cells of the given pair of load cells are integrally joined with the crosspiece of the one axle or with the suspension element connecting the crosspieces of two axles by way of one and the same lower plate constituting two opposite and symmetric mounting sites for said load cells of the given pair.

6. The agricultural vehicle according to claim 1, wherein each load cell has an elongated structure, with an extension along a longitudinal axis, and wherein the longitudinal axes of the four load cells of the two pairs assigned to the axle or to one and the same crosspiece are all situated in one and the same horizontal plane while being parallel to the longitudinal axis of the agricultural vehicle.

7. The agricultural vehicle according to claim 4, wherein each of the four load cells of the two pairs assigned to the axle or to one and the same crosspiece has an elongated structure extending along a longitudinal axis, wherein the two load cells of each pair are conformed and mounted in such a way that their mounting sites at a level of a first plate and at a level of two second plates respectively are substantially aligned.

8. The agricultural vehicle according to claim 1, wherein each load cell consists of an oriented or unidirectional bending or shear sensor that includes an elongated strain gauge of cylindrical form and is deformable under stress in a direction transversal relative to its longitudinal direction and substantially rigid in the other directions.

9. The agricultural vehicle according to claim 1, wherein the bottom of the container is mounted on the two longitudinal support beams that constitute a plurality of sites for integrally joining upper fixation plates of the load cells, permitting a plurality of relative fixation positions for the pairs of load cells relative to the container in the longitudinal direction of the agricultural vehicle.

10. The agricultural vehicle according to claim 4, wherein the second plates are integrally joined with the longitudinal beams by screwing.

11. The agricultural vehicle according to claim 1, further comprising a drawbar, which is connected to the container and/or to the longitudinal support beams disposed under the bottom of said container, in this case by way of an additional load cell.

12. The vehicle according to claim 1, wherein, in the case of a train of wheels with two axles, the axles are fixed at two opposite ends of an elongated suspension element in the form of a leaf-spring arrangement, wherein the two load cells of each of the pairs are integrally joined in centered manner with said leaf-spring arrangement by a lower fixation bracket.

13. The vehicle according to claim 1, wherein, in the case of a train of wheels with two axles, each axle is fixed in centered manner with an elongated suspension element in the form of a leaf-spring arrangement, wherein two opposite ends of said leaf-spring arrangement are each integrally joined with a pair of load cells by way of a fixation bracket, wherein one of said brackets is connected to facing or mutually close ends of the two elongated suspension elements.

* * * * *